(12) United States Patent
Zhan et al.

(10) Patent No.: US 11,515,792 B2
(45) Date of Patent: Nov. 29, 2022

(54) CURRENT SHARING SCHEME IN CURRENT MODE CONTROL FOR MULTIPHASE DC-DC CONVERTER

(71) Applicant: Renesas Electronics America Inc., Milpitas, CA (US)

(72) Inventors: Xiaodong David Zhan, McKinney, TX (US); Prabhjot Singh, San Jose, CA (US); Long Robin Yu, Zhejiang (CN)

(73) Assignee: Renesas Electronics America Inc., Milpitas, CA (US)

( * ) Notice: Subject to any disclaimer, the term of this patent is extended or adjusted under 35 U.S.C. 154(b) by 146 days.

(21) Appl. No.: 16/880,814

(22) Filed: May 21, 2020

(65) Prior Publication Data

US 2020/0389092 A1    Dec. 10, 2020

Related U.S. Application Data (60) Provisional application No. 62/857,175, filed on Jun. 4, 2019.

(51) Int. Cl.
*H02M 3/158* (2006.01)
*H02M 1/00* (2006.01)

(52) U.S. Cl.
CPC .......... *H02M 3/1584* (2013.01); *H02M 1/00* (2013.01); *H02M 1/0025* (2021.05); *H02M 1/0009* (2021.05)

(58) Field of Classification Search
CPC ... H02M 3/1584–1586; H02M 1/0009; H02M 1/0025
See application file for complete search history.

(56) References Cited

U.S. PATENT DOCUMENTS

| | | | | |
|---|---|---|---|---|
| 6,137,274 | A * | 10/2000 | Rajagopalan | H02J 1/102 323/272 |
| 6,404,175 | B1 * | 6/2002 | Yang | H02M 3/1584 323/284 |
| 8,072,200 | B1 * | 12/2011 | Qiu | H02M 3/1584 323/907 |
| 2003/0201761 | A1 * | 10/2003 | Harris | H02M 3/1584 323/272 |
| 2004/0189221 | A1 * | 9/2004 | Kurosawa | H02M 7/53875 318/400.04 |
| 2007/0291520 | A1 * | 12/2007 | Schuellein | H02M 1/0845 363/65 |
| 2014/0117964 | A1 * | 5/2014 | Walters | H02M 3/156 323/299 |
| 2014/0266832 | A1 * | 9/2014 | Schrom | H02M 3/158 341/144 |
| 2016/0211750 | A1 * | 7/2016 | Coleman | H02M 3/158 |
| 2017/0160348 | A1 * | 6/2017 | Din | H02J 7/0014 |
| 2018/0191251 | A1 * | 7/2018 | Tao | H02M 1/08 |
| 2020/0021189 | A1 * | 1/2020 | Li | H02M 3/1584 |

\* cited by examiner

*Primary Examiner* — Gustavo A Rosario-Benitez
(74) *Attorney, Agent, or Firm* — Foley & Lardner LLP (57) ABSTRACT

The present embodiments relate generally to DC-DC converters and more particularly to a scheme for providing current sharing between parallel converters in a multiphase configuration. In some embodiments, a cycle-by-cycle instant correction to the compensation signal offset is provided based on the current share error between the paralleled converters so as to achieve improved instant current share performance.

20 Claims, 7 Drawing Sheets

CURRENT SHARING SCHEME IN CURRENT MODE CONTROL FOR MULTIPHASE DC-DC CONVERTER

CROSS-REFERENCE TO RELATED APPLICATIONS

The present application claims priority to U.S. Provisional Patent Application No. 62/857,175 filed Jun. 4, 2019, the contents of which are incorporated herein by reference in their entirety.

TECHNICAL FIELD

The present embodiments relate generally to DC-DC converters and more particularly to a scheme for providing current sharing between parallel converters in a multiphase configuration.

BACKGROUND

In conventional techniques, current sharing in a multi-phase DC-DC converter configuration is attempted by connecting together the voltage loop error amplifier outputs of the parallel converters. In other words, the peak current loop reference of the parallel converters is tied together. However, inherent component offsets, slope compensation offsets, and mismatched ramp slew rates can cause current share error between the paralleled converters. Accordingly, a solution is needed for these and other issues.

SUMMARY

The present embodiments relate generally to DC-DC converters and more particularly to a scheme for providing current sharing between parallel converters in a multiphase configuration. In some embodiments, a cycle-by-cycle instant correction to the compensation signal offset is provided based on the current share error between the paralleled converters so as to achieve improved instant current share performance.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Figure 1:
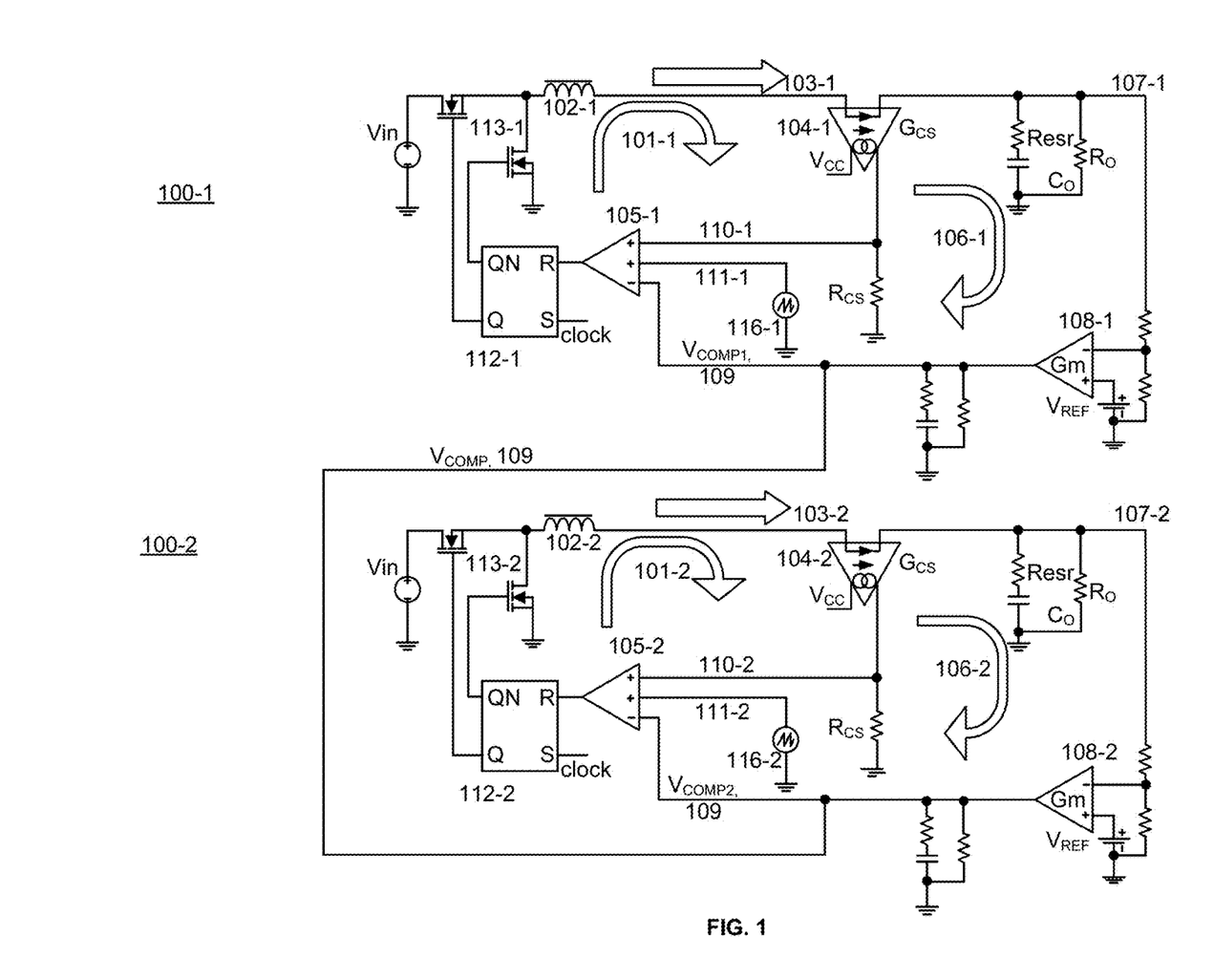
FIG. 1 is schematic diagram illustrating traditional current sharing in peak current mode control.

FIG. 1 is a schematic diagram illustrating approaches to current sharing in a conventional multiphase configuration. It should be noted that there are several advantages to arranging parallel converters in a multiphase configuration to share the current output when providing current to a load as shown in FIG. 1. First, the shared current decreases the stress on the converters and increases the lifetime of the components. Additionally, converters in parallel provide a failsafe; if one module fails in a two-phase example, the other module can quickly increase its current output from providing 50% of the current to providing 100% of the current, minimizing shutdowns or disruptions to the load.

FIG. 1 depicts two converters, 100-1 and 100-2, of two respective phases connected together in a multiphase configuration. Loop 101 in each converter or phase is a current loop while loop 106 is a voltage loop. In current loop 101, the current 103 $I_L$ represents the current in inductor 102. The inductor current 103 is sensed by the current sensing operational amplifier 104, which creates one of the inputs to comparator 105. The current sensing operational amplifier 104 measures the current and outputs a voltage that may be multiplied by a gain as current sense signal 110. In voltage loop 106, the output voltage is sensed by resistor dividers and compared to a reference voltage using error amplifier 108. The output from error amplifier 108 is signal Vcomp 109.

The current sense signal 110 is added to a ramp signal 111 from ramp generator 116 and the sum of 110 and 111 is compared by comparator 105 with the compensation signal Vcomp 109. The output signal from comparator 105 is used as the reset for flip-flop 112, which is set by a clock signal, resulting in a pulse width modulator signal (PWM) having a frequency determined by the clock signal. The pulse width of the PWM signal generated from the output of flip-flop 112 is controlled by the output of the comparator 105. The output PWM signal drives the high/low pair of switches 113 (e.g. power MOSFETs) used to control the voltage supplied to inductor 102, which subsequently modulates the inductor current 103.

The output of comparator 105 thereby modulates the duty cycle of the PWM signal that controls the inductor current. If a load requires more current or voltage, the duty cycle will be high (i.e., the PWM signal will be controlled to be on more relative to the time that it is off). Conversely, if a load requires less current or voltage, the duty cycle will be reduced (i.e., the time that PWM signal is on will be controlled to be reduced relative to the time that it is off). Traditionally, current may be shared between the two parallel converters by connecting the Vcomp signals 109 of the two converters 100-1 and 100-2 together, as shown in the example of FIG. 1.

Theoretically, connecting the Vcomp signals across the two parallel converters together can achieve the goal of equal current sharing between phases in accordance with the PWM signal modulation scheme described above. In practice, however, component tolerances cause problems leading to unequal current sharing. Due to component tolerances, many operating characteristics of the parallel converters, even if all the components are designed to be the same, will be different from each other. For example, due to component tolerances, the output voltages of the converters will not be exactly the same. As indicated by the inverse current-voltage relationship in the well-known power equation, $$\text{Current} = \frac{\text{Power}}{\text{Voltage}},$$

slight differences in voltage can cause big differences in current. Thus, small component mismatches can cause significant problems, and current can be generated from the converters unequally between phases.

Several problems may occur when one converter produces more current to a load than the other converter. For example, the converter providing more of the current may suffer higher stress and reduced reliability. This may decrease the lifetime of the converter. Additionally, significant current drawn from one converter may trigger that converter's overcurrent protection, shutting down that converter. Further, the majority of the current drawn from one converter and not the other may create thermal hotspots. Lastly, if the parallel converters are disproportionately providing current to a load, and the converter supplying the majority of the current fails, the current that was supplying minimal current, for example 5% of the current, must spike its current output from 5% to 100%. As opposed to the current sharing scenario discussed above, where both converters provided current equally and minimized any disruptions to the load, in this scenario, the load may experience a drop in performance caused by the converter needing to compensate for the shift in current production.

Figure 2:
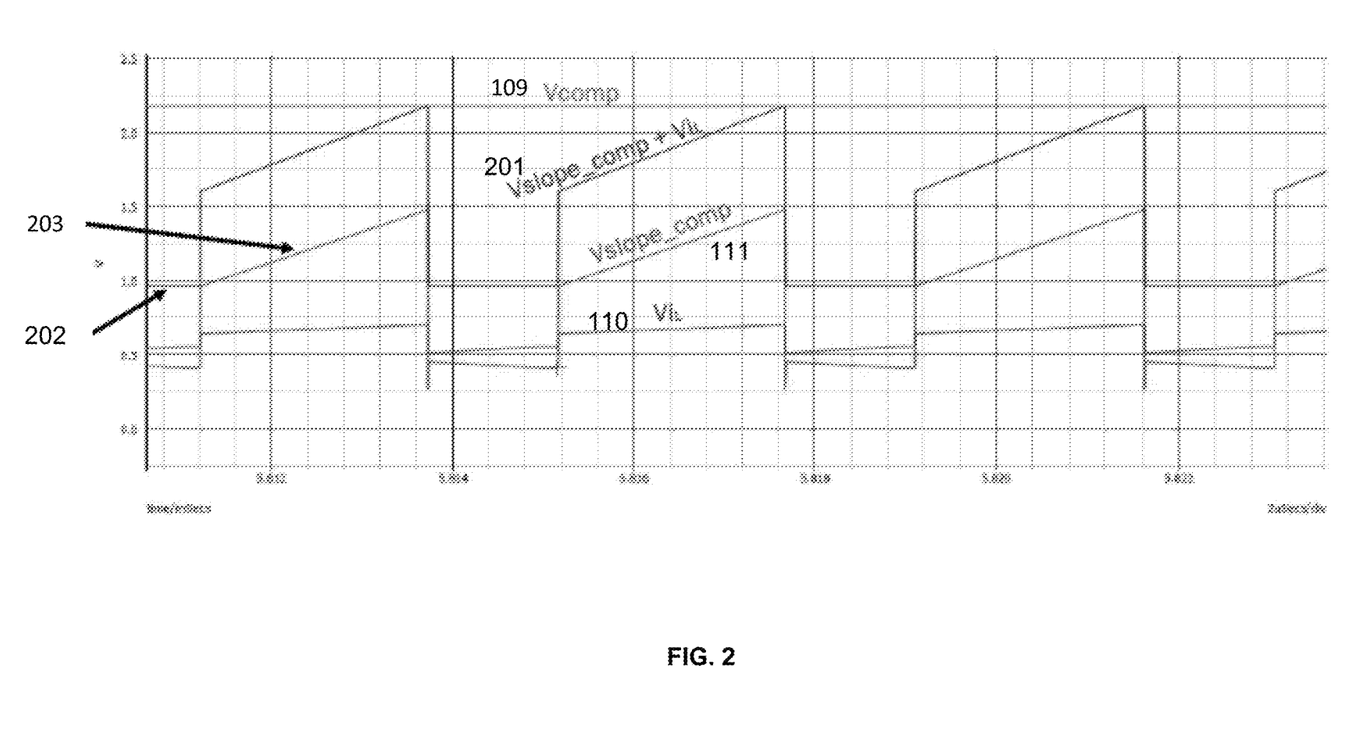
FIG. 2 is a timing diagram illustrating issues with traditional current sharing in peak current mode control.

FIG. 2 is a timing diagram illustrating issues with traditional current sharing techniques in a multiphase configuration such as that shown in FIG. 1. With reference to FIG. 1, the output signal 111 from the ramp generator 116 is shown in FIG. 2 as the signal labeled as Vslope_comp. The sum of this signal and the inductor current signal 110 is shown in FIG. 2 as signal 201 labeled as Vslope_comp+VIL. As set forth above, this signal 201 is compared against compensation signal Vcomp 109 by comparator 105. Moreover, as can be seen in FIG. 2, the magnitude of the summed signal 201 is largely dependent on the ramp signal 111 as compared to the current sense signal 110.

Although the conventional technique shown in FIG. 1 causes the Vcomp signal 109 shown in FIG. 2 in each phase to be the same, current sharing issues can still occur. For example, each component (e.g. ramp generator 116) in each converter has its own device and performance characteristic. These differences impact the offset 202 and slope 203 and thus determine the overall characteristics of signal 111. Matching the operating characteristics of each comparator, component, and/or IC between phases can be challenging, if not impossible. Thus, each comparator, component and/or IC has mismatched characteristics, and thus each phase has mismatched components for performing a comparison with the Vcomp signal in the process of generating the PWM signal in each phase. As discussed above, these mismatched characteristics can cause substantial differences in how the converters share the current distributed to the load. Thus, it is likely that the paralleled converters will not share current equally.

Figure 3:
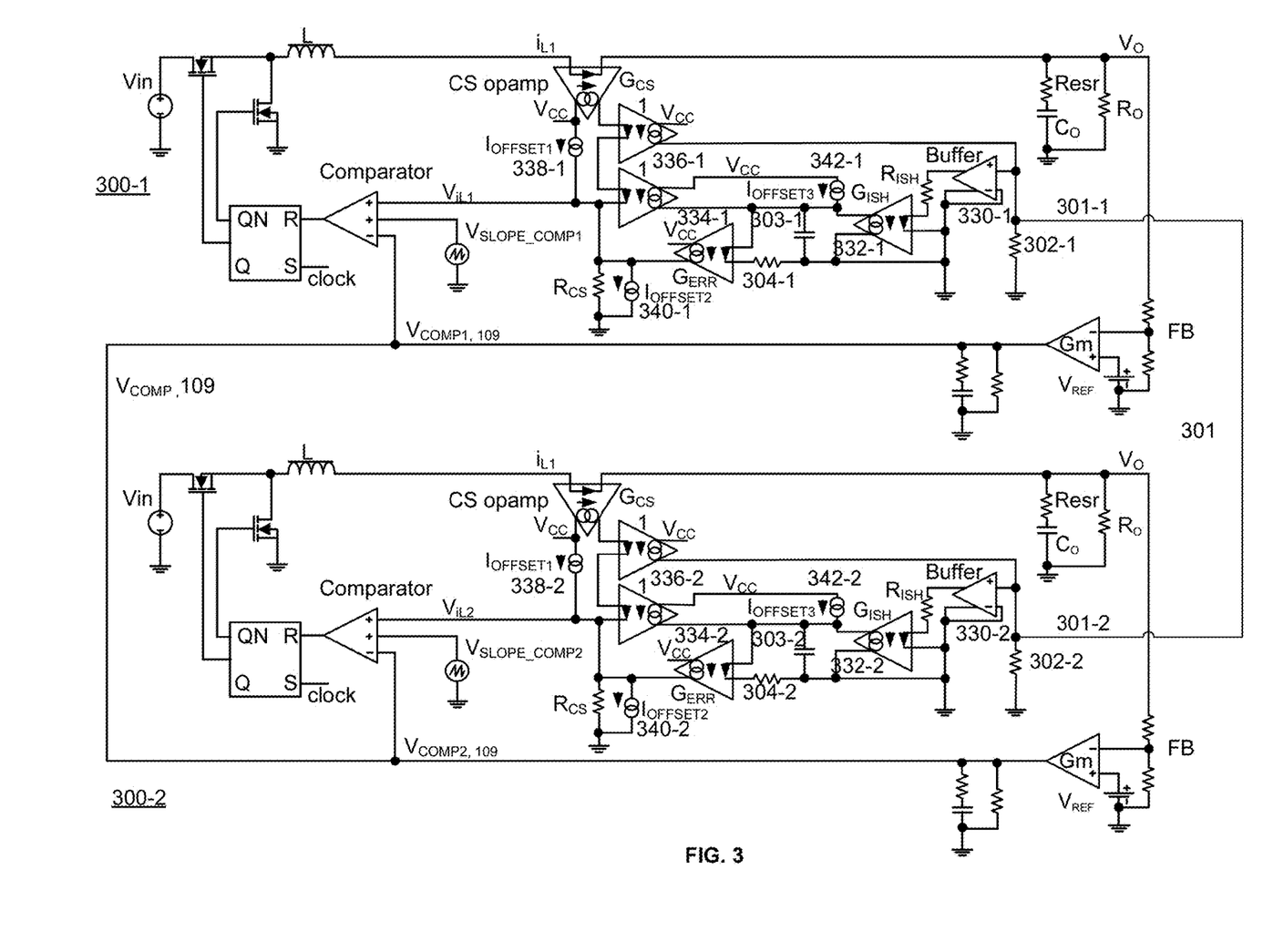
FIG. 3 is a schematic diagram illustrating an example approach of an instant active current circuit according to the present embodiments.

FIG. 3 is a circuit diagram illustrating an example approach to active current sharing according to the present embodiments. The present embodiments will be described in connection with an example peak current mode control configuration; however, this is not limiting and alternate embodiments can be included in other control schemes, such as in a valley current mode control configuration. Moreover, it should be noted that although the present embodiments are described in connection with an example two-phase configuration, the present embodiments are not limited to this example, and that the embodiments may be included in other multi-phase configurations such as three phases, four phases, etc.

FIG. 3 depicts two converters, 300-1 and 300-2, connected together in a two-phase configuration. For achieving current sharing according to the present embodiments, the converters are further tied together in two ways, via the compensation signal 109 and via the share bus 301. As will become more apparent below, the share bus 301 creates an additional closed loop that allows the converters to share current more equally as compared to the conventional approaches. The signal on the share bus 301 represents the average current of all of the paralleled converters. This current sharing technique is designed to match the output current with the average current. Circuit analysis using this figure is helpful in demonstrating how the circuit distributes voltage and current, and how the output current is adjusted to match the average current. $R_{IMON}$ 302 is an external resistor.

As further shown in the example of FIG. 3, to facilitate the inclusion of average current information via share bus 301, converters 300 each include several new components in the path between share bus 301, current sense amplifier 104 and comparator 105. These include buffer 330, first offset amplifier 332 having gain $G_{ISH}$, second offset amplifier 334 having gain $G_{ERR}$, current sense control pair 336 and first, second and third offset current sources 338, 340 and 341, respectively. In general operation, the added new components form an instant active current sharing feedback loop to force the paralleled converters' inductor current to follow the average current set by the share bus 301.

Using well-known circuit analysis techniques, the value $V_{ISH}$ of the voltage on shared bus 301 between the paralleled converters can be described in terms of the components and values shown in FIG. 3 as in Equation 1.

$$V_{ISH} = \frac{(I_{L1} + I_{L2}) \times G_{CS} \times R_{IMON}}{2} = I_{AVG} \times G_{CS} \times R_{IMON}, \quad \text{Equation 1}$$

$$\text{where } I_{AVG} = \frac{(I_{L1} + I_{L2})}{2}$$

Next, assume $I_{OFFSET1} = I_{OFFSET2} = I_{OFFSET3} = 0$ (e.g. by design and/or control of components in FIG. 3). Using this assumption and the voltage $V_{ISH}$ shared between the paralleled converters as set forth in Equation 1, and substituting for $I_{AVG}$ and $V_{ISH}$, the values of the current sense signals the inductors can be calculated. The voltage of the current sense signal for inductor 1 (i.e. $V_{IL1}$) is shown below in Equation 2.

$$V_{IL1} =$$

$$R_{CS} \times \left(I_{L1} \times G_{CS} + G_{ERR} \times \left(I_{L1} \times G_{CS} - \frac{(G_{ISH} \times V_{ISH})}{R_{ISH}}\right)\right)$$

$$V_{IL1} = R_{CS} \times G_{CS} \times$$

$$\left(I_{L1} + G_{ERR} \times \left(I_{L1} - \frac{(I_{AVG} \times G_{ISH} \times R_{IMON})}{R_{ISH}}\right)\right)$$

To simplify further, assume that $$\frac{(G_{ISH} \times R_{IMON})}{R_{ISH}} = 1$$

(e.g. by design and/or control of components in FIG. 3). The simplified equation for $V_{IL1}$ with respect to the circuit elements in FIG. 3 is shown below in Equation 3.

$$V_{IL1} = R_{CS} \times G_{CS} \times (I_{L1} + G_{ERR} \times (I_{L1} - I_{AVG})) \quad \text{Equation 3}$$

Considering Equation 3 above, it is clear that if $I_{L1} > I_{AVG}$ at any time, this will cause $V_{IL1}$ to increase in proportion to the difference between $I_{L1}$ and $I_{AVG}$ (i.e. in proportion to the value of $I_{L1} - I_{AVG}$ in Equation 3 above). This increase in $V_{IL1}$ is greater than that would otherwise be reflected in $V_{IL1}$ without the presence of the share bus 301 and the invented circuit. In this case, as described above in connection with FIG. 1, the converter will cause the duty cycle of the PWM signal fed to the switches 113 to decrease so that $I_{IL1}$ decreases to get closer to $I_{AVG}$. Alternatively, if $I_{L1} < I_{AVG}$, then $V_{IL1}$ decreases by this additional amount, and the duty cycle subsequently increases so that $I_{IL1}$ increases to get closer to $I_{AVG}$. In this manner, each converter will independently aim to provide the same amount of current $I_{AVG}$ during each PWM cycle, thus achieving cycle-by-cycle "active" and/or "instant" current sharing between phases.

A small filter can be used, comprising a resistor 304 and capacitor 303, to dilute the high frequency ripple that may be present in calculating $I_{L1} - I_{AVG}$.

In alternate embodiments, the present current sharing scheme can be extended to multi-phase applications by tying together the compensation signal 109 and share bus 301 of all parallel converters in the multi-phase configuration, in addition to the input voltage, output voltage, and feedback voltage being connected together.

Simulation results of the current sharing techniques according to present embodiments are reproduced in Table 1 below. Table 1 below compares the simulated results of a circuit designed according to present embodiments to simulated results of a circuit designed according to traditional current sharing approaches. The values in the table represent the current error, which is calculated by $I_{L1} - I_{L2}$. The current error values were obtained for various values of $R_{IMON}$ and output current, as indicated in respective rows. In all cases, the current error values were obtained under a condition of a 300 mV difference between VCOMP offsets in the two converters, and a 100 nA charge current difference in slew rates between the ramp generators in the two converters. The values in the first column are simulation results of current error values for a converter having a current share circuit according to the present embodiments, and the values in the second column are simulation results of current error values for a converter having a conventional current share circuit.

TABLE 1

| | IL1 − IL2 in Share Circuit of Embodiments | IL1 − IL2 in Traditional Circuit |
|---|---|---|
| $R_{IMON}$ = 18k<br>$I_{OUT}$ = 20 A | 1.9 A | |
| $R_{IMON}$ = 19.2k<br>$I_{OUT}$ = 20 A | 1.9 A | 16.5 A |
| $R_{IMON}$ = 21k<br>$I_{OUT}$ = 20 A | 1.9 A | |
| $R_{IMON}$ = 18k<br>$I_{OUT}$ = 0 A | 1.9 A | 16.5 A |
| $R_{IMON}$ = 21k<br>$I_{OUT}$ = 0 A | 1.9 A | |

As can be seen, in the conventional approach, the current error between the two converters is very large, regardless the external resistor $R_{IMON}$. Specifically, when $R_{IMON}$=19.2 k and 18 k respectively, the current error was 16.5 A. Additionally, whether 20 A or 0 A were output, the current share error was the same, 16.5 A. In contrast, in a circuit implementing the present embodiments was simulated, the current error remained small, 1.9 A, during each of the 5 simulations. Regardless of $R_{IMON}$ being adjusted, or the output current being adjusted, the current error was controlled within +/−5%.

Figure 4A:
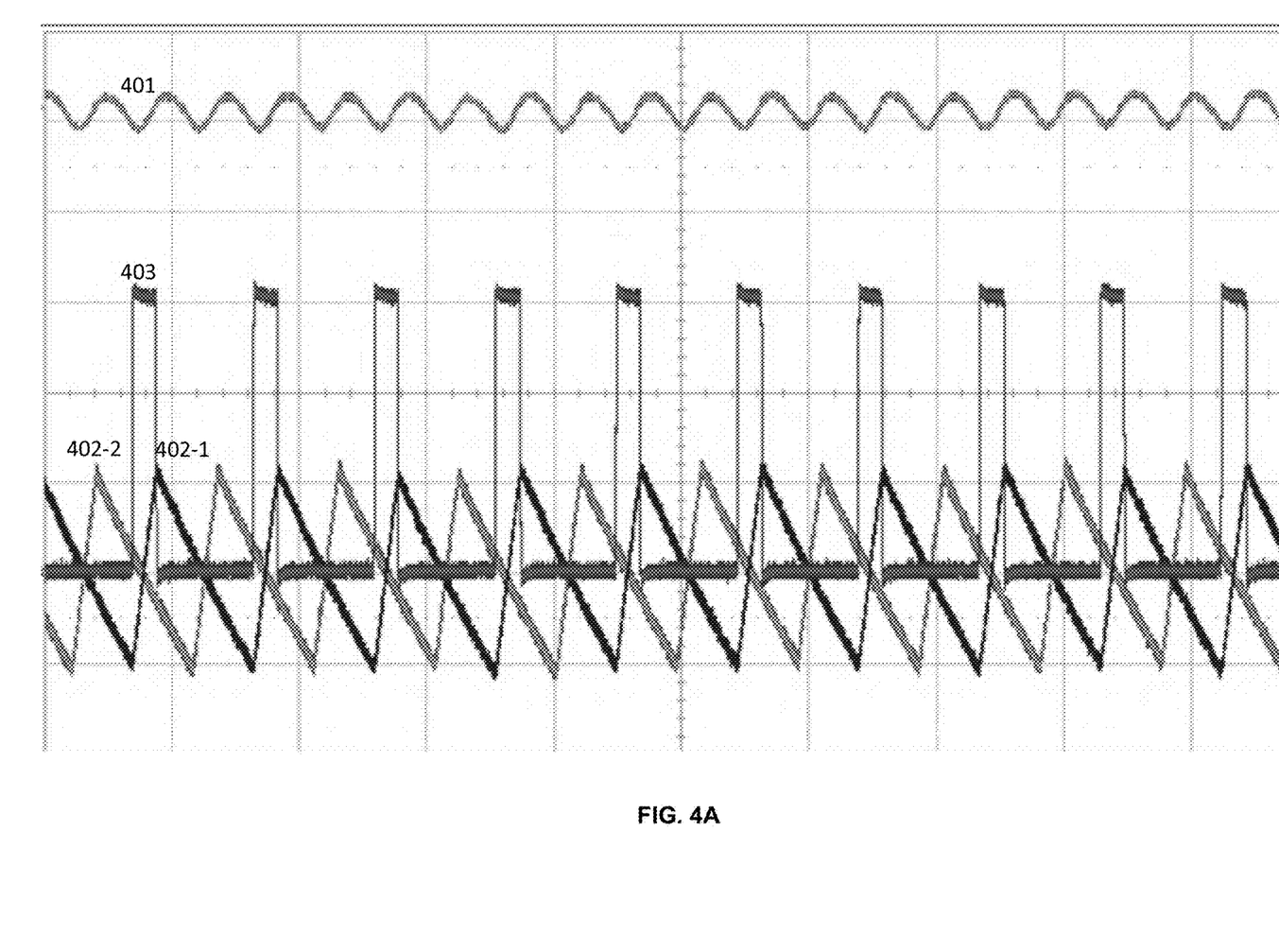
FIG. 4A is a timing diagram showing simulated operating conditions of a circuit designed according to present embodiments and operating with no load.

FIG. 4A is a timing diagram showing simulated operating conditions of a circuit designed according to present embodiments and operating in the presence of no load. As shown in FIG. 4A, the converters are operating together to jointly provide a regulated voltage output, represented by waveform 401. According to aspects of the embodiments, during these conditions, the currents supplied by both converters are substantially the same, although fairly minimal during no load conditions (about 41 mA in each phase in this example). In FIG. 4A, waveform 402-1 represents the current output by one converter (e.g. 300-1) and waveform 402-2 represents the current output by the other converter (e.g. 300-2). Waveform 403 represents the PWM signal in the first phase. As is further apparent, converters 300-1 and 300-2 implement phase interleaving.

Figure 4B:
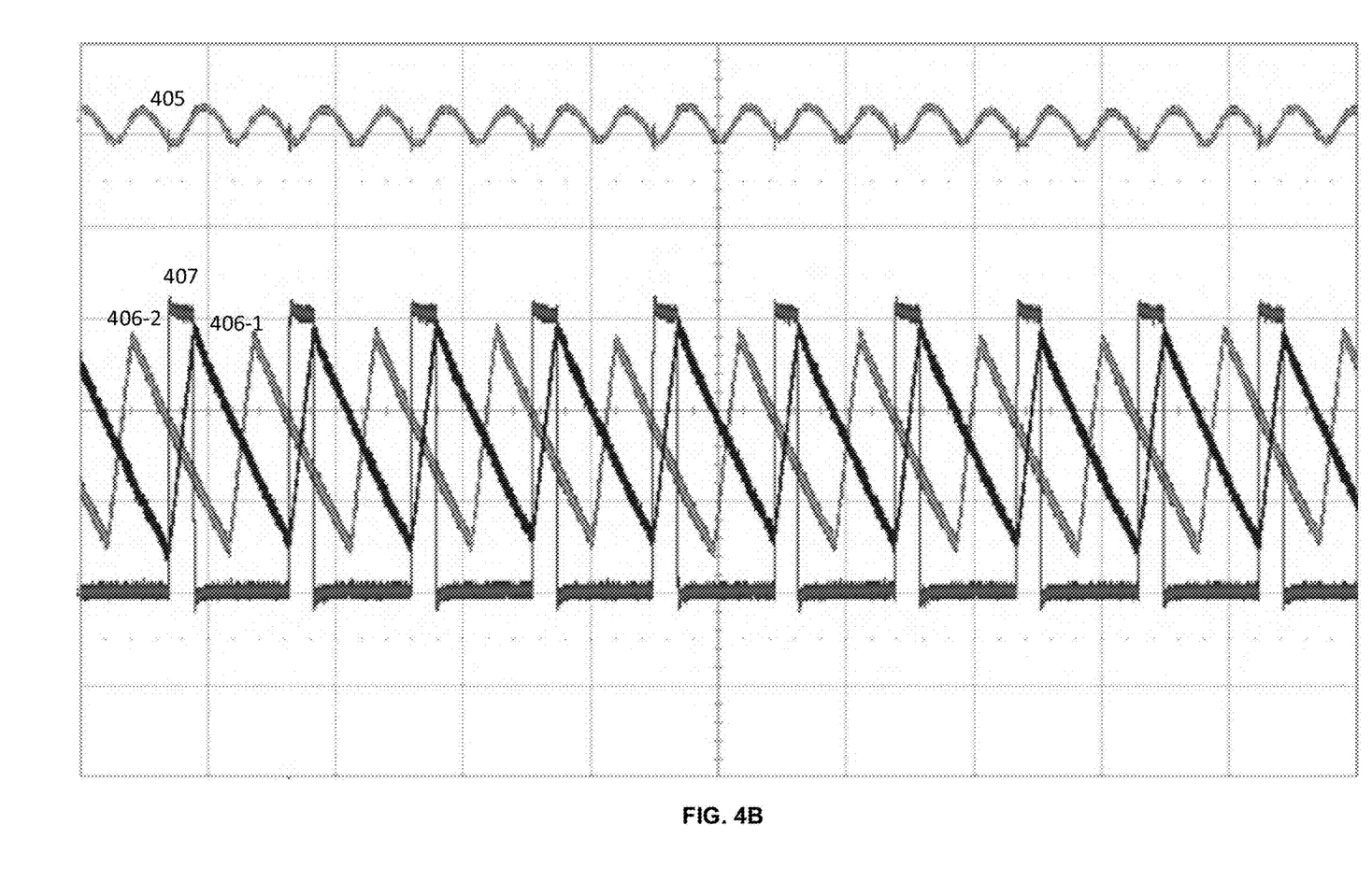
FIG. 4B is a timing diagram showing simulated operating conditions of a circuit designed according to present embodiments and a 10 A load.

FIG. 4B is a timing diagram showing simulated operating conditions of a circuit designed according to present embodiments and operating in the presence of a full load. As shown in FIG. 4B, and in the previous example, the converters are operating together to jointly provide a regulated voltage output, represented by waveform 405. Further according to aspects of the embodiments, during these conditions, the currents supplied by both converters combine to provide the full load current of 10 A in this example. In FIG. 4B, waveform 406-1 represents the current output by one converter (e.g. 300-1) and waveform 406-2 represents the current output by the other converter (e.g. 300-2). As is further apparent, and in accordance with current sharing aspects of the embodiments, the currents provided by converters 300-1 and 300-2 are substantially equal (e.g. within +/−1%).

Figure 5A:
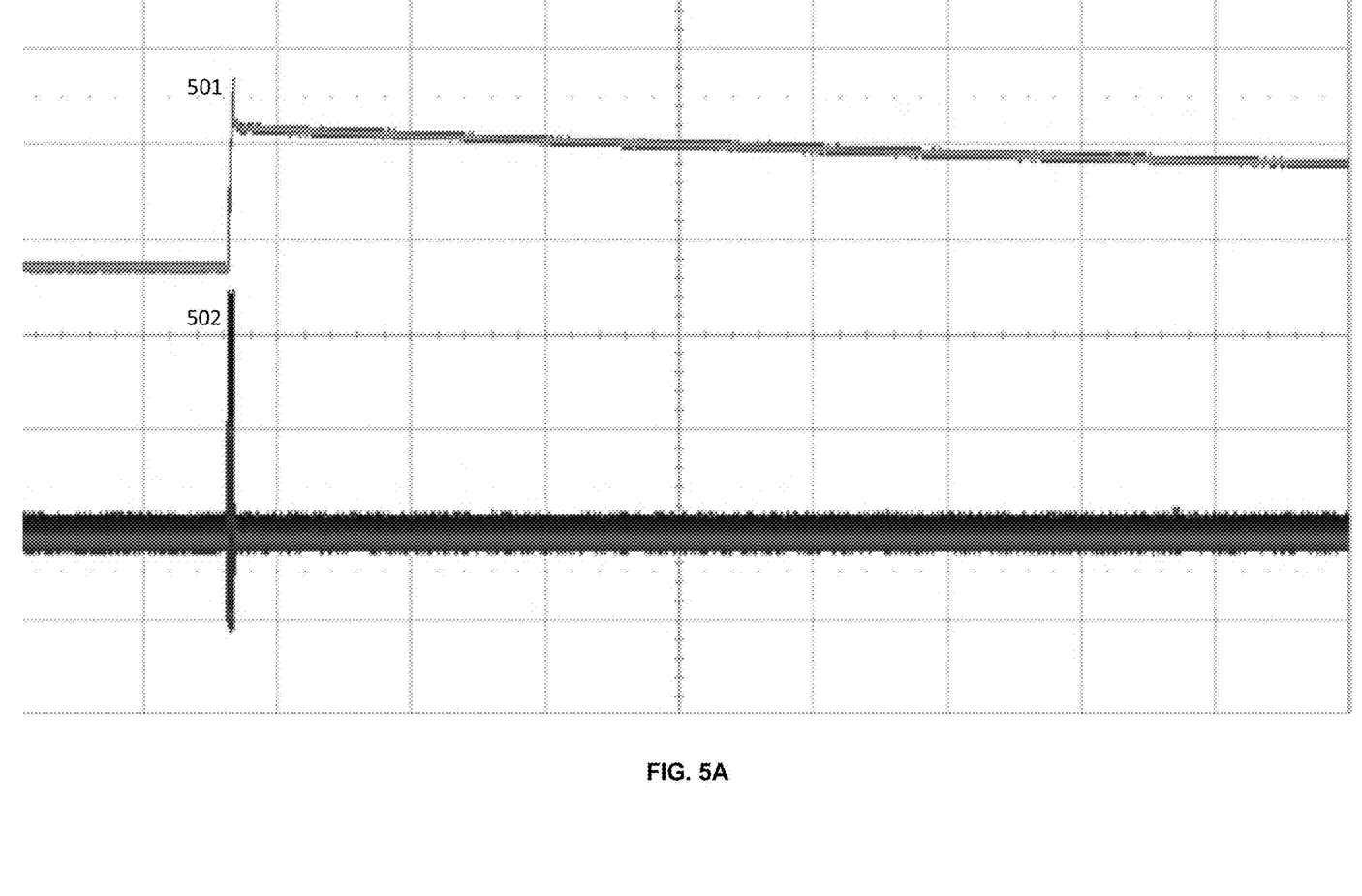
FIG. 5A is a timing diagram showing simulated operating conditions of burst mode of the present embodiments including a circuit such as that shown in FIG. 3.
Figure 5B:
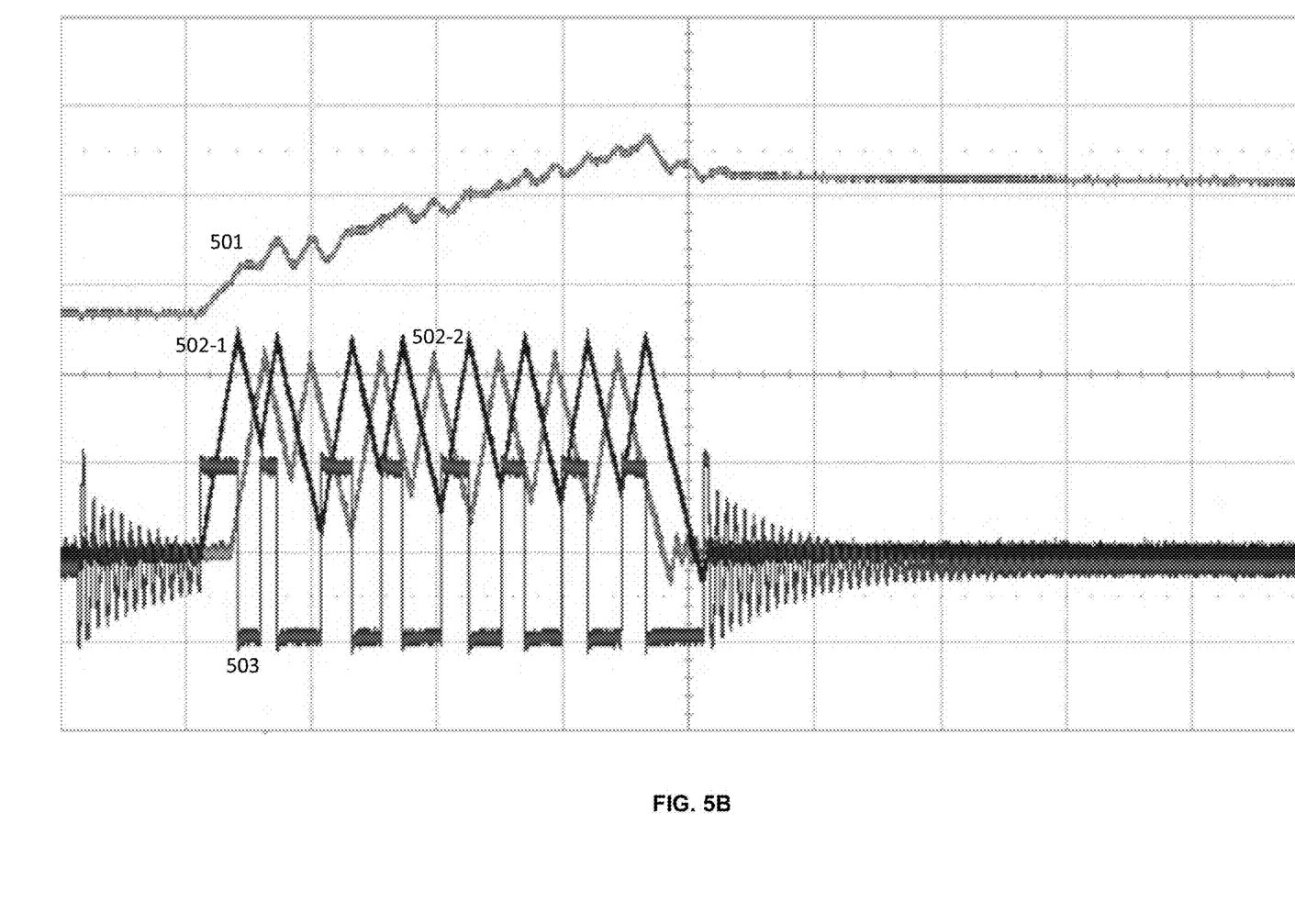
FIG. 5B is another timing diagram showing simulated operating conditions of burst mode of the present embodiments including a circuit such as that shown in FIG. 3.

FIGS. 5A and 5B are timings diagram showing simulated operating results of the present embodiments in a burst mode. In particular, FIG. 5B is a zoomed version of FIG. 5A focusing on the relatively short duration of the burst mode.

Burst mode can be used when there is a light load, a high input voltage, and a small duty cycle. In some instances, small duty cycles can be hard to produce and maintain when there is a high input voltage. During bust off mode, the switches and transistors can idle, causing the output voltage to drop. When the output voltage reaches a certain threshold, the switches and transistors turn on to allow the output voltage to reach its intended value again. In this idle-burst manner, conduction losses and switching losses are reduced.

As shown in FIGS. 5A and 5B, even in burst mode, and in accordance with the "instant" and "active" current sharing features of the present embodiments, the circuit designed according to the present embodiments performs well and the current is shared equally. As shown in FIG. 5A, during burst mode, the output voltage represented by waveform 501 jumps in a very short duration of time, during which a substantial amount of current, as represented by waveform 502, is produced. As further shown in FIG. 5B, even under these burst mode conditions, the relative currents produced by each of the parallel converters (shown by waveforms 502-1 and 502-2) is substantially the same, and interleaved. The PWM signal for the first phase corresponding to waveform 502-1 is provided as waveform 503 for completeness.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A device comprising:
   a first voltage regulator, the first voltage regulator comprising a first phase including a first buffer amplifier, a first offset amplifier having an output coupled with an input of the buffer amplifier, and a first current sense control pair comprising a first output coupled with an input of the first buffer amplifier and a second output coupled with an output of the first offset amplifier; and
   a second voltage regulator, the second voltage regulator comprises a second phase including a second buffer amplifier, a second offset amplifier having an output coupled with an input of the buffer amplifier, and a second current sense control pair comprising a first output coupled with an input of the second buffer amplifier and a second output coupled with an output of the first offset amplifier,
   wherein the first voltage regulator and the second voltage regulator are configured to achieve current sharing based on a current sharing configuration, the current sharing configuration based on matching an output current with an average current.

2. The device of claim 1, wherein the current sharing configuration is based on adjusting a voltage of a current sense signal for a first inductor of a plurality of inductors, the voltage of the current sense signal adjusted based on a comparison of an average current to a first inductor current, wherein the first inductor current is determined by a pulse width modulation signal.

3. The device of claim 2, wherein the adjustments made to the voltage of the current sense signal for the first inductor are accomplished during a pulse width modulation cycle.

4. The device of claim 1, wherein the current sharing configuration further comprises
   a first electrical connection, the first electrical connection connecting the first voltage regulator and the second voltage regulator via a compensation signal; and
   a second electrical connection, the second electrical connection connecting the first voltage regulator and the second voltage regulator via a share bus.

5. The device of claim 4, wherein the share bus transfers an average current, the average current on the share bus determined using the first and second buffer amplifiers, the first and second offset amplifiers, one or more current sources, and the first and second current sense control pairs.

6. The device of claim 4, wherein the compensation signal is an output signal from an error amplifier, the error amplifier outputting the output signal measuring an error between a reference voltage and a system output voltage, the system output voltage sensed by a resistor divider configuration.

7. The device of claim 1, wherein the first phase is configured by a first inductor, a current from the first inductor controlling a peak current mode.

8. The device of claim 1, wherein the second phase is configured by a second inductor, a current from the second inductor controlling a peak current mode.

9. The device of claim 1, wherein the first phase is configured by a first inductor, a current from the first inductor controlling a valley current mode.

10. The device of claim 1, wherein the second phase is configured by a second inductor, a current from the second inductor controlling a valley current mode.

11. The device of claim 1, wherein the device is further configured to support multi-phase applications.

12. The device of claim 11, wherein the multi-phase applications are provided by one or more parallel voltage regulators, the one or more parallel voltage regulators each comprising one or more phases.

13. The device of claim 12, wherein the one or more parallel voltage regulators are electrically connected via a compensation signal, a share bus, an input voltage, a system output voltage, and a feedback voltage, wherein the compensation signal is an output signal from an error amplifier, the error amplifier outputting the output signal measuring an error between a reference voltage and the system output voltage, wherein the system output voltage is sensed by a resistor divider configuration, wherein the share bus transfers an average current, and wherein the feedback voltage is the feedback voltage based on the error amplifier.

14. The device of claim 1, wherein the first voltage regulator and the second voltage regulator each comprise at least a voltage loop and a current loop.

15. The device of claim 14, wherein the current loop further comprises an inductor coupled to a current sensing operational amplifier, the current sensing operational amplifier coupled to a comparator.

16. The device of claim 15 wherein the current sensing operational amplifier measures a current based on the inductor and outputs a current sensed voltage, wherein the current sensed voltage is input into the comparator.

17. The device of claim 16, wherein the current sensed voltage measured by the current sensing operational amplifier based on an inductor current.

18. The device of claim 16, wherein the current sensed voltage measured by the current sensing operational amplifier multiplied by a gain.

19. The device of claim 14, wherein the voltage loop further comprises a resistor divider configuration coupled to an error amplifier, the error amplifier coupled to a comparator.

20. The device of claim 18 wherein the resistor divider senses a system output voltage, wherein comparing the system output voltage to a reference signal via the error amplifier produces a compensation signal, the compensation signal input into the comparator.

* * * * *